(No Model.) 2 Sheets—Sheet 2.
J. O. ROLLINS.
PLOW.
No. 309,650. Patented Dec. 23, 1884.
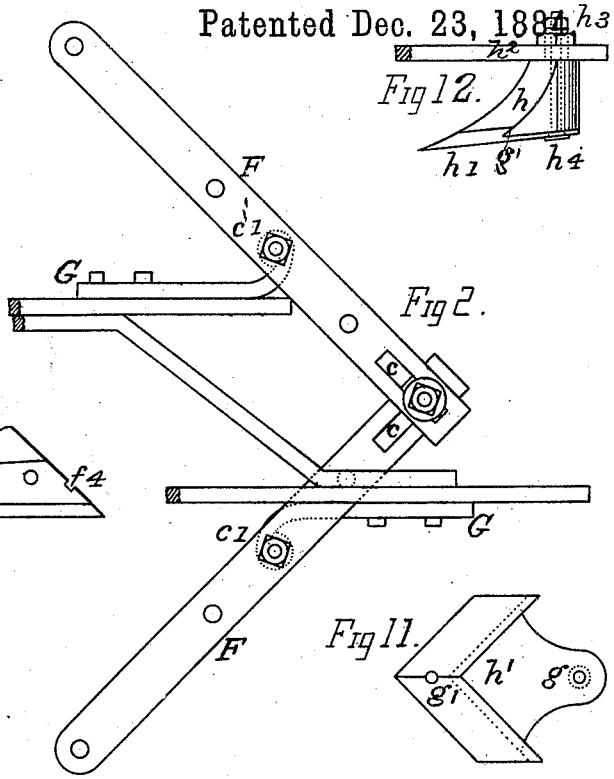
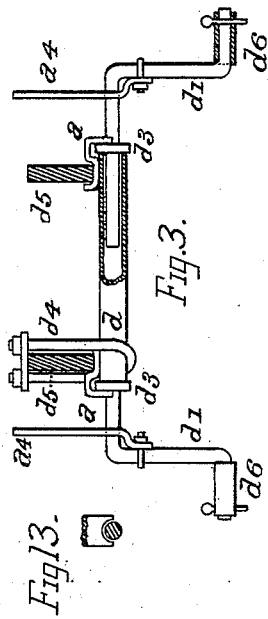
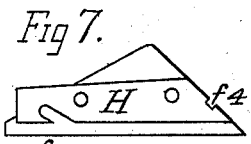
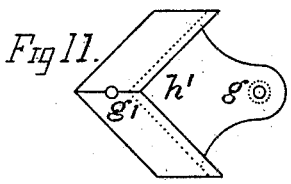
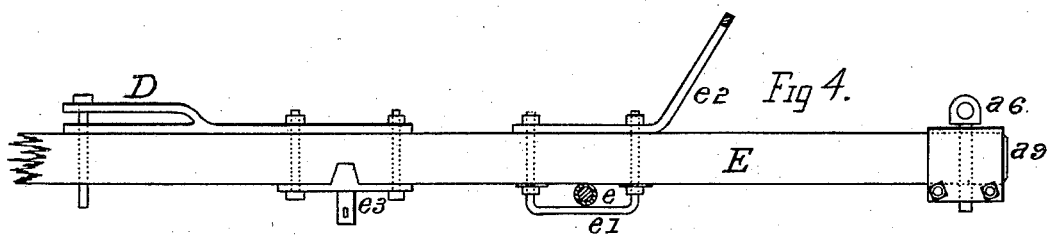
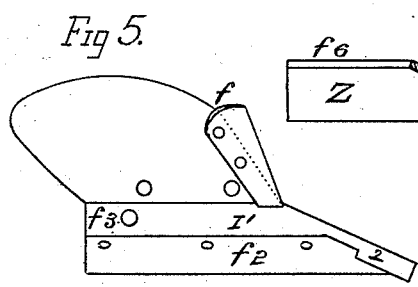
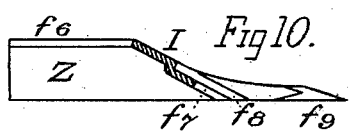
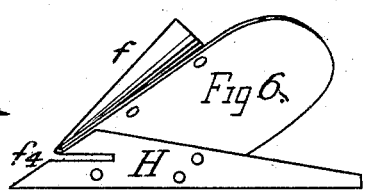
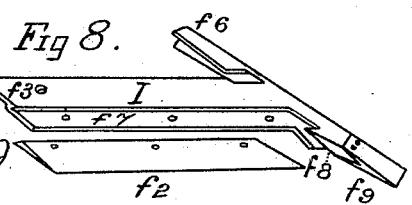
WITNESSES;
D. J. Osborne
Ed. P. Jones
INVENTOR;
John O. Rollins

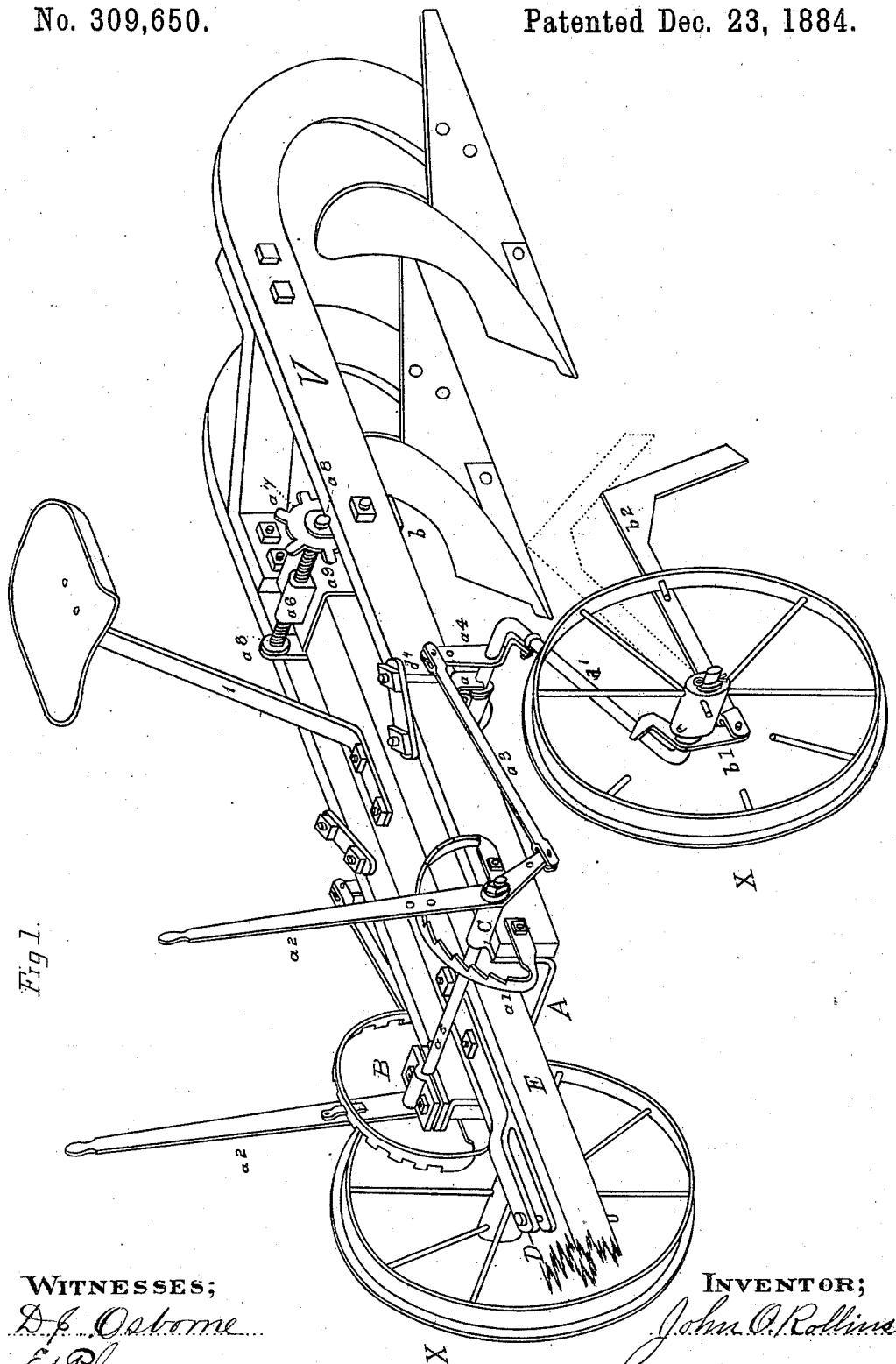

UNITED STATES PATENT OFFICE.

JOHN O. ROLLINS, OF CHICO, CALIFORNIA.

PLOW.

SPECIFICATION forming part of Letters Patent No. 309,650, dated December 23, 1884.

Application filed April 9, 1883. (No model.)

*To all whom it may concern:*

Be it known that I, JOHN O. ROLLINS, a citizen of the United States, residing at Chico, in the county of Butte and State of California, have invented certain new and useful Improvements in Plows, of which the following is a description.

My invention relates to certain new and useful improvements in sulky-plows, colters, shares, and frogs; and the objects of my invention are, first, to provide a convenient and powerful leverage for raising the plows; second, to provide a more perfect and simple land-gage than those now in use; third, to provide a simple and effective method for raising the plows by the power of the team; fourth, to make a practicable detachable-edged share; fifth, to make a practicable and rigid "slip-share;" sixth, to provide a frontal protector to the mold-board, that at the same time serves as a colter and forms an easy inclined plane, which allows the mold-board to pierce the soil with less power from the team; and, seventh, to provide a practicable adjustable cultivator attachment to sulky-plows. I attain these objects by the mechanism illustrated in the accompanying drawings, in which—

Figure 1 is a perspective view of my sulky-plow when adjusted for plowing. Fig. 2 is a top view of a cultivator attachment. Fig. 3 is a view of the axle, cranks, and crank-levers, and a cross-section of the plow-beams, showing the construction in detail. Fig. 4 is a side elevation of the tongue. Fig. 5 is a view of the plow proper, showing the detachable-edged share, mold-board protector, and colter; Fig. 6, a landside view of the frog and colter. Fig. 7 shows the side of the frog to which the mold-board and share are attached. Fig. 8 is a view of the share with the edge detached. Fig. 9 is the share-edge; Fig. 10, a side elevation of the land-side of the plow-share, an inside view with the "share-plate" cut away close to the landside, showing the socket $f^3$ for the reception of the end of the share-edge $f^2$, and a side elevation of the detachable point $f^9$. Fig. 11 is a top view of a share for a cultivator-tooth. Fig. 12 is a cultivator-tooth. Fig. 13 is a sectional view of the crank and clamp.

Similar letters refer to similar parts throughout the several views.

In Fig. 1, E is a section of the tongue, and V the plow-beam.

The levers $a^2$ are pivoted to the shaft $a^5$, which passes through boxes in the ends of the draft-plate A when the horse-power draft-plate is used. The intention is to make two styles of the draft-plate A, one with boxes, as shown at B, and the shaft $a^5$, to be attached to plows for those who should wish to use the plow-frame as a horse-power between the plowing seasons; and another style, as shown at C, to be attached to plows for those who should never wish to use the plows as a horse-power.

The style of construction of the draft-plate A at C is a plain spindle onto which the levers $a^2$ are pivoted.

The levers $a^2$ and $a^4$ are connected by the connecting-rod $a^3$, in the manner shown in the drawings, which permits of the hand-lever $a^2$ being drawn back toward the rear of the plows in raising them, and the said levers being provided with extra pin-holes the leverage can be increased to suit the operator.

The crank-levers $a^4$ are provided with holes through which the cranks $d'$, Figs. 1 and 2, pass, and staples with threads and nuts hold the lower ends of said levers and prevent them from turning on the cranks. This method is preferable to welding when tubular cranks are used, which I prefer on account of the greater bridging strength in proportion to the weight of metal. When solid bar-iron is used to make the cranks, the levers $a^4$ may be welded to the cranks with advantage. By drawing the hand-lever $a^2$ toward the rear of the plows the cranks $d'$ are made to assume an upright position, thus raising the plows.

The power-lifting device $b'$ and $b^2$ consists of a dog, of wood or iron, formed as shown at $b^2$, and connected to the lever $b'$, as shown in the drawings. The lever $b'$ is a plate of iron, formed with an angle at which a hole is made through it, through which the spindle on the crank-axle $d'$ passes. One end of the lever $b'$ is provided with projections at right angles to the said lever $b'$, which, when the said lever is placed in position for use, are bent around the crank $d'$, as shown, to hold the lever $b'$ from turning on the spindle when the dog $b^2$ is forced into the ground for raising the plows.

The reason for not placing the dog $b^2$ directly on the spindle, instead of connecting it to the lever $b'$, as shown, is that, when the plows are lowered for plowing, the spindle on the crank $d'$ might be above a line drawn from the axle to the point of the dog $b^2$, in which case the plows would be drawn down, instead of up, and when the aforesaid line is even nearly reached by the spindle, the power of the dog $b^2$ to perform its office is greatly diminished; but by pivoting the dog $b^2$ to the lever $b'$ below the spindle the power of the device is increased.

I do not confine myself to this exact construction of the horse-power lifting device, but may pivot the dog $b^2$ on the spindle, instead of the lever $b'$, and dispense with the latter; or I may use other devices or contrivances for raising the plows by the power of the team, by the means of forcing a projection into the ground or onto the ground and entirely separate and independent of the wheels. I am aware that devices for raising the plows by the power of the team, by fixing to the wheels various appliances, have been used and patented by others; but I am not aware of any device for raising the plows where the fulcrum has rested on the ground independent of the carrying-wheels, or where any device has been used the friction of which on the ground and separate and independent of the carrying-wheels has been the means of raising the plows. At the rear end of the tongue a screw land-gage is attached for the purpose of giving the plows more or less land by changing the line of the tongue.

$a^8$ is a screw-shaft, and $a^7$ a turning-wheel, said shaft passing through the nut $a^6$, which is provided with a stem, as shown at $a^5$, Fig. 4, which passes through the end of the tongue and through the grip or clamp $a^9$. The screw-shaft $a^8$, which is journaled in the holding-plates $b$, being revolved by the turning-wheel $a^7$, carries the nut $a^6$ and the tongue from side to side. The holding-plates $b$ have their lower ends bent under the beam to prevent them from turning when held by a single bolt. A grip, $a^9$, clasps the end of the tongue, as shown, the iron covering three sides of the tongue, and the bottom left open. By this means the grip can be drawn up by the bolts so as to always keep it tight on the tongue.

In Fig. 3, $d$ is the axle, which consists of a short section of iron pipe, into the ends of which the cranks $d'$ $d'$ are inserted as far as the collars $d^3$ $d^3$. The cranks are held into the pipe-axle by clutches $a$ $a$, which are formed to fit over the collars $d^3$ $d^3$, and are held in place by being clamped between the axle and plow-beam by the staples $d^4$. A sectional view of the clutch $a$ is shown in Fig. 13, which shows the form for fitting on over the crank-shaft outside the collar.

$a^4$ $a^4$, Fig. 3, show an edge view of the crank-levers and the manner of fastening them to the cranks. The spindles, Fig. 3, are provided with shells $d^6$, which are intended to prevent the spindles from wearing out, and may be cheaply renewed. One spindle is shown whole and the other in a half-section. They are held in place by the keys that hold the wheels on the spindle.

In Fig. 1 the wheels are provided with flanges X X, which are intended to relieve the pressure from the landside. By moving the land-side end of the axle a little ahead of the opposite end, the tendency of the wheels would be to run toward the furrow side, and the pressure would be transferred from the landside to the flanges X X, and the principal friction would be on the hubs and their bearings, which, being oiled, it is evident the friction would be much less than the same pressure would cause on the landside.

Fig. 4 is a side elevation of the tongue. $e$ is a cross-section of the pipe-axle $e'$. A staple that clasps the axle and passing through the tongue holds the seat in place, as shown in Fig. 1; also, the staple $e'$ is provided with two sets of nuts, so as to permit of the seat being held firmly in place and allow the axle to play back and forth in the staple when the land-gage is used. The tongue-plate $e^3$ is provided with a solid pin rigidly fixed to it, and ears, as shown in the drawings, to receive the lateral pressure of the tongue and prevent it from splitting in the pin-holes. The pin on the said tongue-plate passes through the hole in the draft-plate A, and is the king-bolt by which the plows are drawn. The tongue-plate $e^3$ and draft-strap D are bolted solidly to the tongue in the manner shown in the drawings. The draft-strap D is provided with a slit at its forward end for holding the double-tree. By this construction the strain comes all on the iron strap and does not wear out the hole in the tongue, and makes a firm and durable device for attaching the team to the plows.

In Fig. 5, $f$ is a mold-board protector and colter combined, and is bolted to the mold-board in the manner shown. Its lower end is formed to fit down over the edge of the mold-board, and a corresponding section is removed from the share to fit around the end of the colter, as shown in Figs. 5 and 8. This sword-colter and mold-board protector is formed with an easy graceful curve, which makes an excellent entering wedge for the mold-board to follow, and gives to a plow constructed in this manner great advantage in lightness of draft. A land-side view of the colter $f$ is shown in Fig. 6.

I, Figs. 5 and 8, is a detachable-edged share. $f^2$ $f^2$ is the detachable edge, connected in Fig. 5 and detached in Fig. 8.

In Fig. 5 the point and body of the share are one and the same piece of metal, and in Figs. 8 and 10 a detachable point, $f^0$, is shown, which may be used in light soil, free from rocks and roots, while for stubborn land the style shown in Fig. 5 is the more reliable. Its point, when worn out, is renewed by welding on a piece of steel in the usual way, and the detachable edge $f^2$ is riveted or bolted in place, as shown, and may be sharpened, without being removed from the share, in the usual way. By this method of construction the body part of the share may be made of cast metal and the detachable edge of sheet-steel, which permits of cheap construction, and wrought-steel in place of cast metal to work at the forge, which is much easier and safer done. By replacing the edge piece $f^2$ when worn out a great saving in shares is effected, as the body part will outwear a great many edges.

In Fig. 8 the share is shown detached from the plow and with its edge detached. In this figure, I is the body of the share. $f^7$ shows the bed in which the detachable edge $f^2$ rests. A semi-dovetail sink is formed at its rear edge, into which the beveled rear edge of the detachable edge $f^2$ fits, and in connection with the rivets or bolts holds the edge in place. It is further secured by having its forward end locked in the socket $f^8$, Figs. 8 and 10. The bed $f^7$ extends down the land side of the share and forms a rest for the under side of the piece $f^2$ to rest on, and a section of the point overlaps the piece $f^2$ on its upper side and locks it firmly to its bed. In connecting this share to the frog but one bolt is used, and the nut does not have to be taken off, but simply loosened. The projection on the land side of the share $f^6$ slides into a groove or slot, $f^4$, in the frog, Figs. 6 and 7, the two figures showing the different sides of the frog, and the bolt $f^3$ slides into the slot $f^5$, Fig. 7. The slots $f^4$ and $f^5$ are parallel to each other, so that in putting the share on the projection $f^6$ and bolt $f^3$ slide readily into their respective slots, and the share is held steady by tightening the nut on the bolt $f^3$. This share and frog have a great advantage over those which are bolted on with numerous bolts, as it is difficult to work them under a plow-bottom.

In Fig. 6, H is a land-side view of the frog with the mold-board connected, and $f$ is a land-side view of the sword-colter, showing the method of fastening it to the mold-board. A furrow-side view of the frog is shown in Fig. 7, in which the two holes are for bolting on the mold-board, and the slot $f^5$ is for receiving the bolt $f^3$ in the share. In Figs. 8 and 10, $f^8$ is the socket into which the edge piece $f^2$ fits.

In Fig. 5 the point 2 is a piece of wrought or rolled steel and the body I cast to it, the said body I being of cast metal. By casting the body I around a section of the point 2 to hold it solidly in place, a steel point that can be sharpened at the forge can be attached to a quality of cast metal that is not suitable for the points and edges of plowshares.

The detachable edge $f^2$, used in connection with a plowshare constructed as described above, permits of the manufacture of a very cheap and at the same time very durable plowshare. The edge $f^2$, of wrought or rolled steel, may also be fastened to the body I by casting the said body I to it.

Fig. 2 is a top view of a cultivator attachment for my improved sulky-plow consisting of the frame F F, with slots $c$ $c$, through which a bolt passes for securing them in position, and the arms G G, on which the frame F F is pivoted, and the cultivator bottoms or teeth, shown in Figs. 11 and 12. The arms G G are either bolted or clamped to the standards of the plow-beams. By this method of construction the cultivator may be adjusted to different widths for working between the rows of growing crops, trees, and vines, and it may also be reversed, carrying the slotted ends ahead, and the outer ends to the rear, if it is desired to work it in this manner.

In Fig. 11 a top view of a share or bottom plate is shown, and in Fig. 12 a side elevation of the body part of the tooth is shown, and the manner of connecting it to the frame. $h$ is the body of the tooth or mold-board; $h'$, the share; $h^2$, the hollow stem of the body part that passes through the frame F, and is secured to it by a nut, which is screwed onto the said stem, as shown in the drawings. The share $h'$ is secured to the tooth-body $h$ by sliding the flanged connection $g'$ on over the front edge of the tooth $h$, and by a bolt, $h^4$, passing through the body of the tooth and hollow stem and share and secured at the top by a nut, $h^5$.

The share $h'$ may be made in one solid piece of cast metal, or the bottom part and top flange and cutting-edge $g'$ may be made in two separate pieces, and riveted together with one or more rivets, as shown in the drawings.

Having thus described my invention, what I claim, and desire to secure by Letters Patent of the United States, is—

1. In a sulky-plow, the combination, with the frame and rock-shaft, of the lever $a^2$, connecting-rod $a^3$, sectional crank-axle $d'$, and rigid crank-lever $a^4$, substantially as shown and described.

2. The combination of the tubular axle $d$, crank $d'$, crank-lever $a^4$, and clutch $a$, when arranged substantially as shown and described, and for the purpose set forth.

3. The combination, with the crank-axle, of the dog $b^2$ and lever $b'$, for raising the plows by the power of the team, substantially as shown and described.

4. In a horse-power lifting device, the dog $b^2$ and lever $b'$, in combination with the crank-axle $d'$, levers $a^2$ and $a^4$, and connecting-rod $a^3$, substantially as shown and described.

5. The share I, having the locking-projection $f^6$, bed $f^7$, socket $f^8$, detachable point $f^9$, and detachable edge $f^2$, riveted to the bed $f^7$, substantially as shown and described.

6. The frog H, provided with the socket or slots $f^4$ and $f^5$, substantially as shown and described, and for the purpose set forth.

JOHN O. ROLLINS.

Witnesses:
LEE D. CRAIG,
D. RICH.